(12) United States Patent
Ulanski

(10) Patent No.: US 8,529,120 B2
(45) Date of Patent: Sep. 10, 2013

(54) BLENDER CONTAINER AND COVER

(75) Inventor: Robert M. Ulanski, Broadview Heights, OH (US)

(73) Assignee: Vita-Mix Corporation, Cleveland, OH (US)

( * ) Notice: Subject to any disclaimer, the term of this patent is extended or adjusted under 35 U.S.C. 154(b) by 996 days.

(21) Appl. No.: 12/077,251

(22) Filed: Mar. 18, 2008

(65) Prior Publication Data

US 2009/0238034 A1  Sep. 24, 2009

(51) Int. Cl.
*A47J 43/046* (2006.01)

(52) U.S. Cl.
USPC .................................. 366/314; 241/282.1

(58) Field of Classification Search
USPC ........... 222/465.1; 241/199.12, 282.1, 282.2;
366/130, 185, 205, 314; 220/633–638
See application file for complete search history.

(56) References Cited

U.S. PATENT DOCUMENTS

| 796,692 | A | * | 7/1868 | Scantlin et al. | 220/635 |
|---|---|---|---|---|---|
| 181,013 | A | * | 8/1876 | Sawyer | 220/635 |
| 400,566 | A | * | 4/1889 | Harry | 220/611 |
| 698,755 | A | * | 4/1902 | Stiehle | 220/638 |
| 742,955 | A | * | 11/1903 | Augur | 220/491 |
| 937,772 | A | * | 10/1909 | Cullen | 220/635 |
| 1,139,534 | A | * | 5/1915 | Klenk | 220/637 |
| 1,380,066 | A | * | 5/1921 | Johnson | 222/465.1 |
| 2,246,054 | A | * | 6/1941 | Marty | 241/97 |
| 2,404,915 | A | * | 7/1946 | McCullough | 220/4.02 |
| D163,117 | S | | 5/1951 | Hobbs | D7/318 |
| 2,626,078 | A | * | 1/1953 | Hutchisson, Jr. et al. | 220/623 |
| 2,761,659 | A | * | 9/1956 | Collura | 241/282.2 |
| 2,798,701 | A | * | 7/1957 | Collura | 366/205 |
| 2,924,349 | A | * | 2/1960 | Huck | 215/382 |
| 2,954,174 | A | * | 9/1960 | Polleys | 241/74 |
| 3,064,949 | A | * | 11/1962 | Dewenter | 241/195 |

(Continued)

FOREIGN PATENT DOCUMENTS

| EP | 0 963 726 | 12/1999 |
| FR | 2585676 A3 * | 2/1987 |

OTHER PUBLICATIONS

Annex to Form PCT/ISA/206 Communication Relating to the Results of the Partial International Search (International Application No. PCT/US2009/001077—1 page from communication dated Jun. 29, 2009).

*Primary Examiner* — David Sorkin

(74) *Attorney, Agent, or Firm* — Renner, Kenner, Greive, Bobak, Taylor & Weber

(57) ABSTRACT

A container (11) for a blender includes a base surface (13) and a blade (20) which is rotatable on an axis above the base surface (13). An arcuate wall (14) and two generally straight walls (15, 16) extend upwardly from the base surface (13) and terminate at the upper end of container (11). The axis of rotation of the blade (20) is closer to the arcuate wall (14) than it is to the generally straight walls (15, 16). A skirt (25) extends downwardly from the base surface (13) and has an opening. Sound baffling fingers (32) extend from the skirt (25) and into the opening. A spout (40) is formed at the intersection of two of the walls (14, 15, 16), the spout (40) having an entry point located approximately twenty to thirty percent of the height of the walls (14, 15, 16) from the upper end of the container (11). A handle (34) is positioned opposite to the spout (40) and a cover (12) includes a plug (55) to close the spout (40).

15 Claims, 8 Drawing Sheets

(56) References Cited

U.S. PATENT DOCUMENTS

| | | | |
|---|---|---|---|
| 3,175,594 A * | 3/1965 | Jepson et al. | 241/199.12 |
| 3,216,473 A * | 11/1965 | Dewenter | 241/167 |
| D204,117 S | 3/1966 | De Sesa | D7/378 |
| 3,240,246 A * | 3/1966 | Dewenter | 241/98 |
| 3,311,353 A | 3/1967 | Rogenski | 366/197 |
| 3,362,590 A * | 1/1968 | Martin | 222/465.1 |
| 3,419,196 A * | 12/1968 | Moore | 222/465.1 |
| D217,178 S | 4/1970 | Crider | D7/317 |
| D220,416 S * | 4/1971 | Folden | D7/413 |
| 3,738,583 A * | 6/1973 | Berland et al. | 241/46.17 |
| D227,535 S | 7/1973 | Grimes | D7/318 |
| D228,698 S | 10/1973 | Barnard, Jr. | D7/378 |
| 3,812,995 A * | 5/1974 | Lewis | 220/1.5 |
| 3,963,220 A * | 6/1976 | Ohchi | 366/98 |
| 4,561,782 A | 12/1985 | Jacobsen et al. | 366/349 |
| 4,655,373 A | 4/1987 | Essen | 222/465.1 |
| 4,660,733 A * | 4/1987 | Snyder et al. | 220/634 |
| 4,671,452 A * | 6/1987 | Pupp et al. | 229/106 |
| D309,077 S | 7/1990 | Pomroy | D7/318 |
| D336,590 S | 6/1993 | Barnard | D7/378 |
| 5,226,558 A * | 7/1993 | Whitney et al. | 220/571 |
| 5,287,980 A * | 2/1994 | Saltz | 220/4.27 |
| 5,323,973 A * | 6/1994 | Ferrara, Jr. | 241/37.5 |
| 5,332,115 A * | 7/1994 | Schafer | 220/608 |
| D350,451 S | 9/1994 | Dickson | D7/384 |
| 5,397,022 A * | 3/1995 | Schafer | 220/675 |
| 5,551,594 A * | 9/1996 | Schafer | 220/675 |
| 5,738,240 A * | 4/1998 | Vavra et al. | 220/1.5 |
| 5,823,382 A * | 10/1998 | Van Giezen et al. | 220/571 |
| 5,888,565 A * | 3/1999 | Gics | 426/124 |
| 5,957,577 A * | 9/1999 | Dickson et al. | 366/197 |
| 5,958,484 A * | 9/1999 | Gics | 426/122 |
| 6,065,861 A * | 5/2000 | Chen | 366/144 |
| D429,956 S | 8/2000 | Bohannon et al. | D7/413 |
| D435,192 S | 12/2000 | Bohannon et al. | D7/413 |
| D437,731 S | 2/2001 | Thackray | D7/413 |
| D452,296 S | 12/2001 | Egnell et al. | D23/209 |
| D480,915 S | 10/2003 | Kolar et al. | D7/413 |
| 6,632,013 B2 * | 10/2003 | Wulf et al. | 366/199 |
| 6,705,484 B2 * | 3/2004 | Schafer | 220/628 |
| 6,715,706 B1 * | 4/2004 | Planca et al. | 241/36 |
| D495,925 S * | 9/2004 | Ulanski et al. | D7/412 |
| 6,811,303 B2 | 11/2004 | Dickson, Jr. | 366/206 |
| 6,854,876 B2 | 2/2005 | Dickson, Jr. | 366/205 |
| 6,979,117 B2 | 12/2005 | Dickson, Jr. | 366/205 |
| D514,868 S | 2/2006 | Achenbach et al. | D7/318 |
| 7,063,456 B2 | 6/2006 | Miller et al. | 366/205 |
| D526,839 S * | 8/2006 | Boozer et al. | D7/392 |
| D527,575 S * | 9/2006 | Ulanski et al. | D7/392 |
| D528,363 S | 9/2006 | Ulanski et al. | D7/413 |
| 7,267,478 B2 | 9/2007 | Miller et al. | 366/205 |
| D552,916 S | 10/2007 | Bodum | D7/318 |
| 7,275,666 B2 * | 10/2007 | Rukavina et al. | 222/570 |
| 7,281,842 B2 * | 10/2007 | Dickson, Jr. | 366/205 |
| 7,350,963 B2 | 4/2008 | Williams et al. | 366/205 |
| 7,357,273 B1 * | 4/2008 | Lutz et al. | 220/785 |
| D577,545 S * | 9/2008 | Ulanski | D7/412 |
| D588,406 S * | 3/2009 | Ulanski | D7/413 |
| 7,520,659 B2 * | 4/2009 | Wulf et al. | 366/198 |
| 7,632,007 B2 * | 12/2009 | Wulf et al. | 366/142 |
| 7,648,264 B2 * | 1/2010 | Breviere et al. | 366/205 |
| 2002/0141286 A1 | 10/2002 | Wulf et al. | 366/206 |
| 2002/0176320 A1 * | 11/2002 | Wulf et al. | 366/205 |
| 2003/0213373 A1 | 11/2003 | Dickson, Jr. | 99/348 |
| 2003/0214875 A1 | 11/2003 | Dickson, Jr. | 366/206 |
| 2004/0011798 A1 * | 1/2004 | Dubois et al. | 220/639 |
| 2005/0099884 A1 * | 5/2005 | Lee | 366/205 |
| 2005/0133514 A1 * | 6/2005 | Schutz | 220/630 |
| 2005/0258197 A1 * | 11/2005 | Rukavina et al. | 222/465.1 |
| 2006/0108372 A1 * | 5/2006 | Aiken et al. | 220/634 |
| 2006/0176765 A1 * | 8/2006 | Pryor et al. | 366/192 |
| 2006/0261066 A1 * | 11/2006 | Boozer et al. | 220/254.7 |
| 2007/0165484 A1 | 7/2007 | Branson et al. | 366/192 |
| 2008/0170465 A1 * | 7/2008 | Bohannon et al. | 366/205 |
| 2009/0032551 A1 * | 2/2009 | McGinley et al. | 222/129 |
| 2009/0045229 A1 * | 2/2009 | McGinley et al. | 222/465.1 |
| 2009/0129200 A1 * | 5/2009 | Breviere et al. | 366/205 |

* cited by examiner

BLENDER CONTAINER AND COVER

TECHNICAL FIELD

This invention relates to a container and cover for use with a blender. More particularly, this invention relates to a container which is shaped to efficiently blend materials therein and which can easily discharge those materials through a pouring spout that is closed by the cover during blending operations.

BACKGROUND ART

Traditional containers for a blender have most often been generally round or square in configuration with at least some of these containers being provided with a pouring spout. That spout is usually positioned near the top of one of the sidewalls or a corner of the container at the rim thereof. As such, when the blended material is to be poured through the spout, it tends to congregate around the spout, and while some of that material will properly pass through the spout, some of it can also be misdirected past the sides of the spout. At times, such can result in an unsatisfactory transfer of the material.

When the spout is not in use, such as when the material is being blended, the spout should preferably be closed. Attempts have been made to utilize the cover of the container to also close the spout, but such attempts have not always proved successful.

Many blenders create a certain amount of noise which in some environments can be distracting. Usually the motor housing is equipped with some type of sound reducing or muffling device or the entire blender can be positioned in a housing to deaden the noise of the motor. However, it is believed to be heretofore unknown to provide a sound deadening feature on the blender container itself to reduce the sound emanating from the blade as it is mixing the materials.

It has also been found that the square or round configurations of the container do not provide the most efficient blending as the blender blade rotates near the bottom of the container. The first known attempts at improving the efficiency of the blender by changing the shape of the container are depicted in U.S. Pat. No. 7,063,456. The present invention seeks to improve or expand upon the configurations shown in that patent.

DISCLOSURE OF THE INVENTION

It is thus an object of one aspect of the present invention to provide a container for a blender which is shaped to provide efficient blending performance.

It is an object of another aspect of the present invention to provide a container, as above, in which the container itself is configured to assist in reducing the noise emanating from the blender.

It is an object of an additional aspect of the present invention to provide a container, as above, with a pouring spout that is located for more efficient pouring.

It is an object of yet another aspect of the present invention to provide a container, as above, with a cover that attaches to the container and completely closes the pouring spout.

These and other objects of the present invention, as well as the advantages thereof over existing prior art forms, which will become apparent from the description to follow, are accomplished by the improvements hereinafter described and claimed.

In general, a container for a blender made in accordance with one aspect of the present invention includes a base surface and a blade positioned above the base surface and rotatable on an axis. An arcuate wall and first and second generally straight walls extend upwardly from the base surface. The generally straight walls intersect each other and each of the generally straight walls intersect the arcuate wall. The arcuate walls and the generally straight walls are positioned such that the axis of rotation of the blade is closer to the arcuate wall than to the generally straight walls.

In accordance with another aspect of the invention, a container for a blender includes a base surface and walls extending upwardly from the base surface. A skirt extends downwardly from the base surface and has an opening therein. Fingers extend from the skirt into the opening and are spaced from each other to baffle the noise of the blender.

A container made in accordance with yet another aspect of the invention includes a base surface and walls extending upwardly from the base surface and terminating as the upper end of the container. A spout is formed between two of the walls and has an entry point located approximately twenty to thirty percent of the height of the walls from the upper end of the container.

A container having these aspects of the invention includes a base surface and a blade positioned above the base surface and rotatable on an axis. An arcuate wall and first and second generally straight walls extend upwardly from the base surface. The generally straight walls intersect each other and each of the generally straight walls intersect the arcuate wall. The walls terminate as the upper end of the container and are positioned such that the axis of rotation of the blade is closer to the arcuate wall than to the generally straight walls. A skirt extends downwardly from the base surface and has an opening therein. Fingers extend from the skirt into the opening and are spaced from each other to baffle the noise of the blender. A spout is formed between two of the walls and has an entry point located approximately twenty to thirty percent of the height of the walls from the upper end of the container.

A preferred exemplary blender container and cover according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

A blender container and cover assembly is indicated generally by the numeral 10 and includes a pitcher or container generally indicated by the numeral 11 and a lid or cover generally indicated by the numeral 12. Container 11 may be made of any suitable rigid plastic material, such as a copolyester material, and cover 12 may be made of any suitable flexible material such as synthetic rubber.

Figure 6:
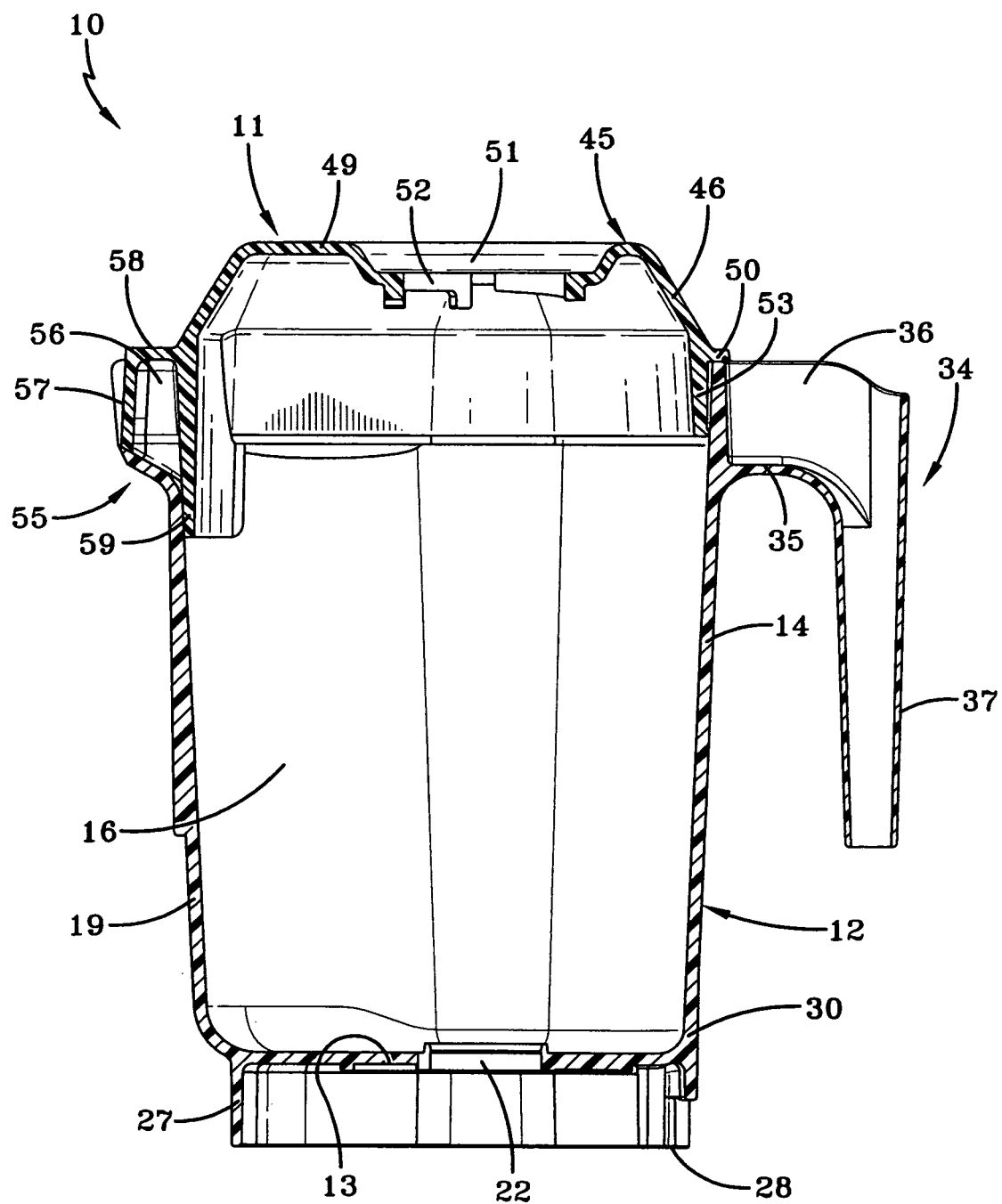
FIG. 6 is a sectional view taken substantially along line 6-6 of FIG. 4.
Figure 6A:
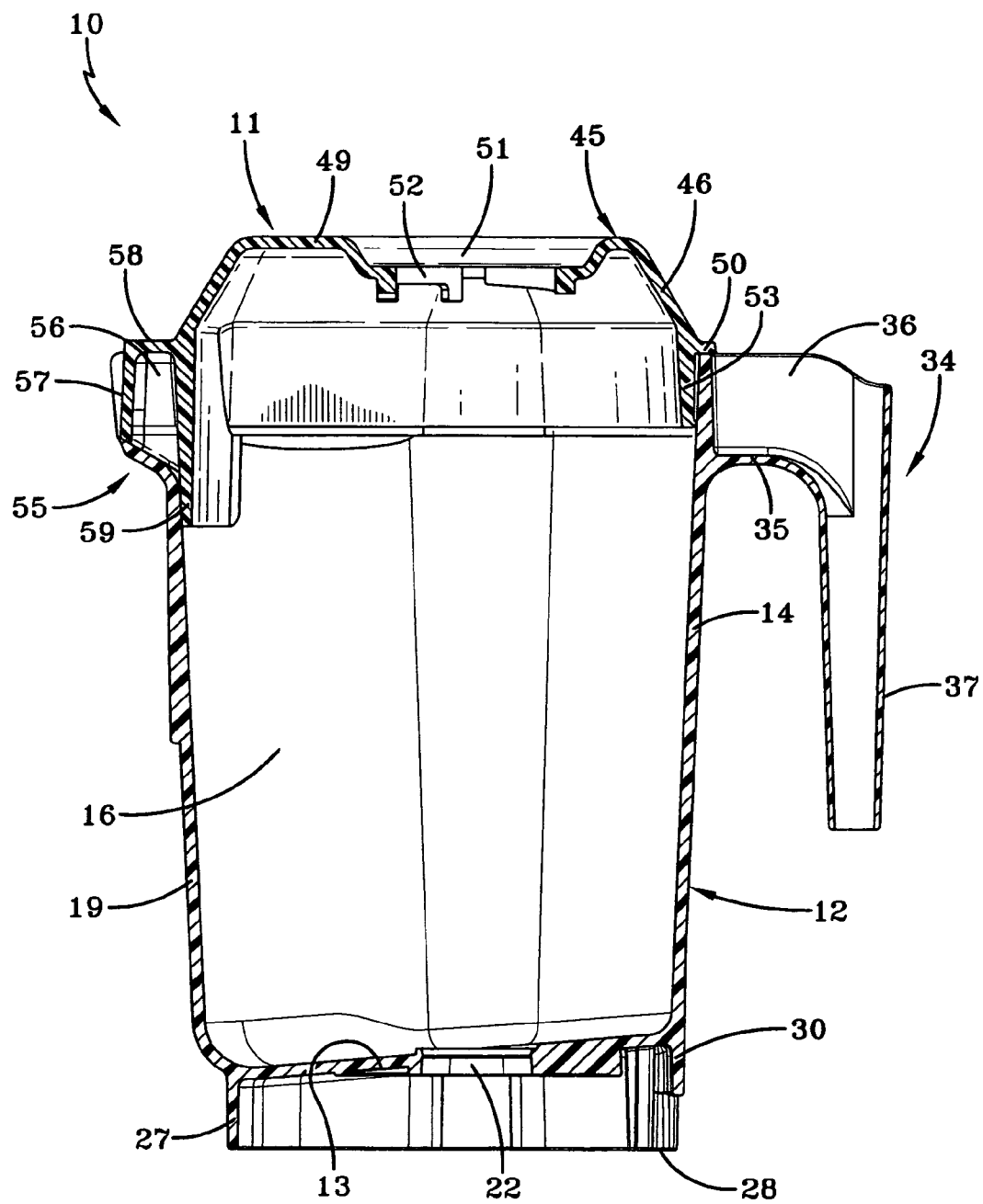
FIG. 6A is a view like FIG. 6 but showing an alternative configuration for the bottom surface of the container.

Container 11 includes a bottom or base surface 13 having three sidewalls 14, 15, and 16 extending upwardly from the periphery thereof. Sidewall 14 is arcuate in nature being formed as one continuous curve or arc, while sidewalls 15 and 16 are generally straight. Sidewall 14 intersects sidewall 15 at a radiused corner 17 and intersects sidewall 16 at a radiused corner 18. Straight sidewalls 15 and 16 intersect each other at a radiused corner 19. As shown in FIG. 6, container base surface 13 is preferably generally flat. However, as shown in FIG. 6A, base surface 13 can be sloped downwardly from sidewall 14 toward sidewalls 15 and 16 and corner 19 which in some situations could improve the blending efficiency.

Figure 5:
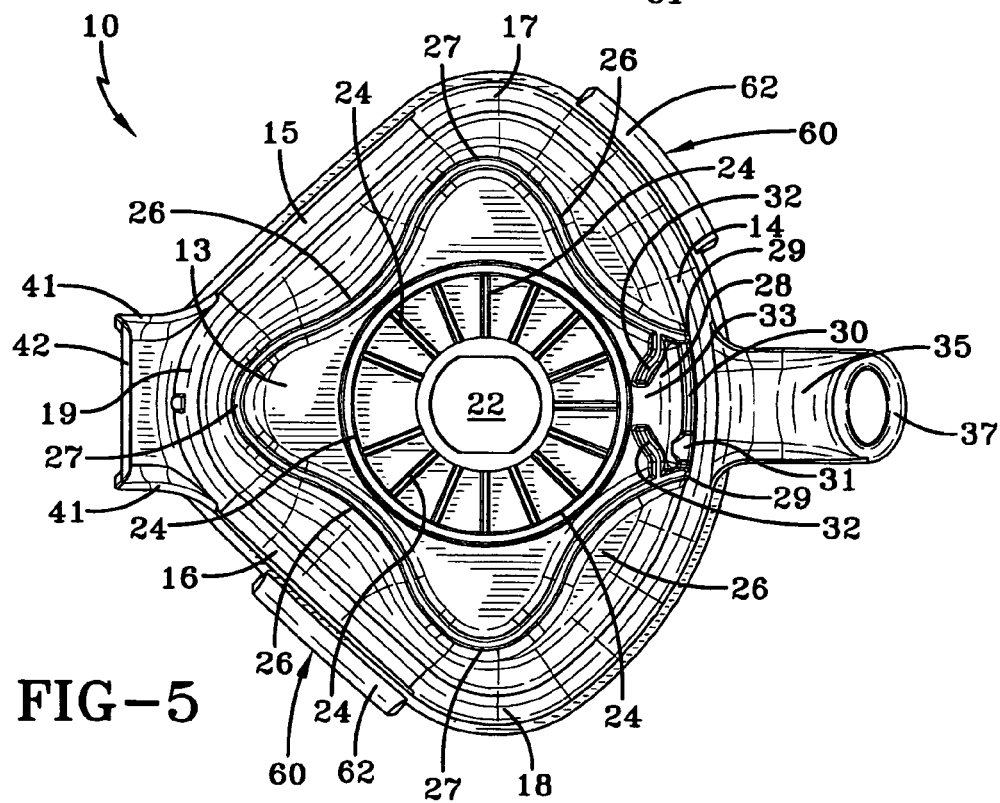
FIG. 5 is a bottom plan view thereof.
Figure 8:
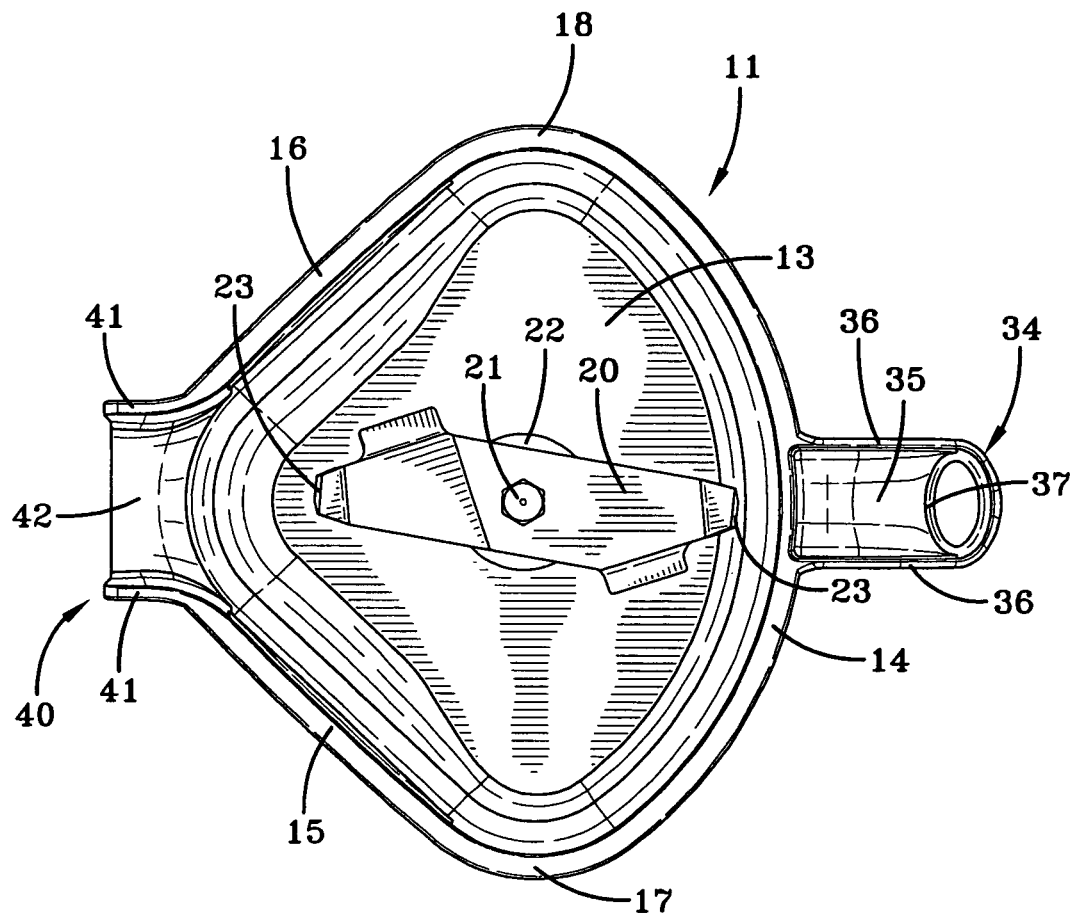
FIG. 8 is a top plan view of the blender container of the present invention with the cover removed.

As shown in FIG. 8, a blender blade 20 is conventionally located slightly above base surface 13 and rotates on an axis defined by a shaft 21 driven by a motor (not shown) in a housing (not shown) upon which container 11 is positioned during the blending process. A shaft coupler (not shown) extends downwardly from blade 20 through an opening 22 in base 13 such that when container 11 is positioned on the motor housing, shaft 21 is coupled to the motor shaft to turn therewith. When blade 20 rotates, because its axis of rotation is closer to wall 14 than it is to walls 15 and 16, its outer tips 23 advantageously come closer to wall 14 than they do to walls 15 and 16. The effect of such is to increase the mixing ability of blade 20 because wall 14 cuts off the flow of material and a pumping action is created between the area between wall 14 and blade 20 and the area between blade 20 and walls 15 and 16. Moreover, if the base surface 13 is sloped, blade 20 and its tips are closer to base 13 at the area of wall 14 than they are at the area of walls 15 and 16. As shown in FIG. 5, the bottom of base 13 is provided with a wagon wheel spoke-like pattern of ribs 24 to provide strength to the unit and otherwise support the components which connect shaft 21 to the motor shaft.

Container 11 rests on a skirt, generally indicated by the numeral 25, which extends downwardly from base surface 13. Skirt 25 is generally scalloped having four recess areas 26 spaced between and extending outwardly to three lobes 27 and a partial lobe 28. Partial lobe 28 is provided in view of the curved nature of sidewall 14 such that the lobe 28 is cut off at end points 29 to form an opening therebetween. A tab 30 extends downwardly to some extent into the opening between the end points 29 of lobe 28. In a conventional manner, there are four alignment pads (not shown) positioned at the top of the motor housing, and lobes 27 fit over three of them while tab 30 rests on top of the fourth pad.

Figure 3:
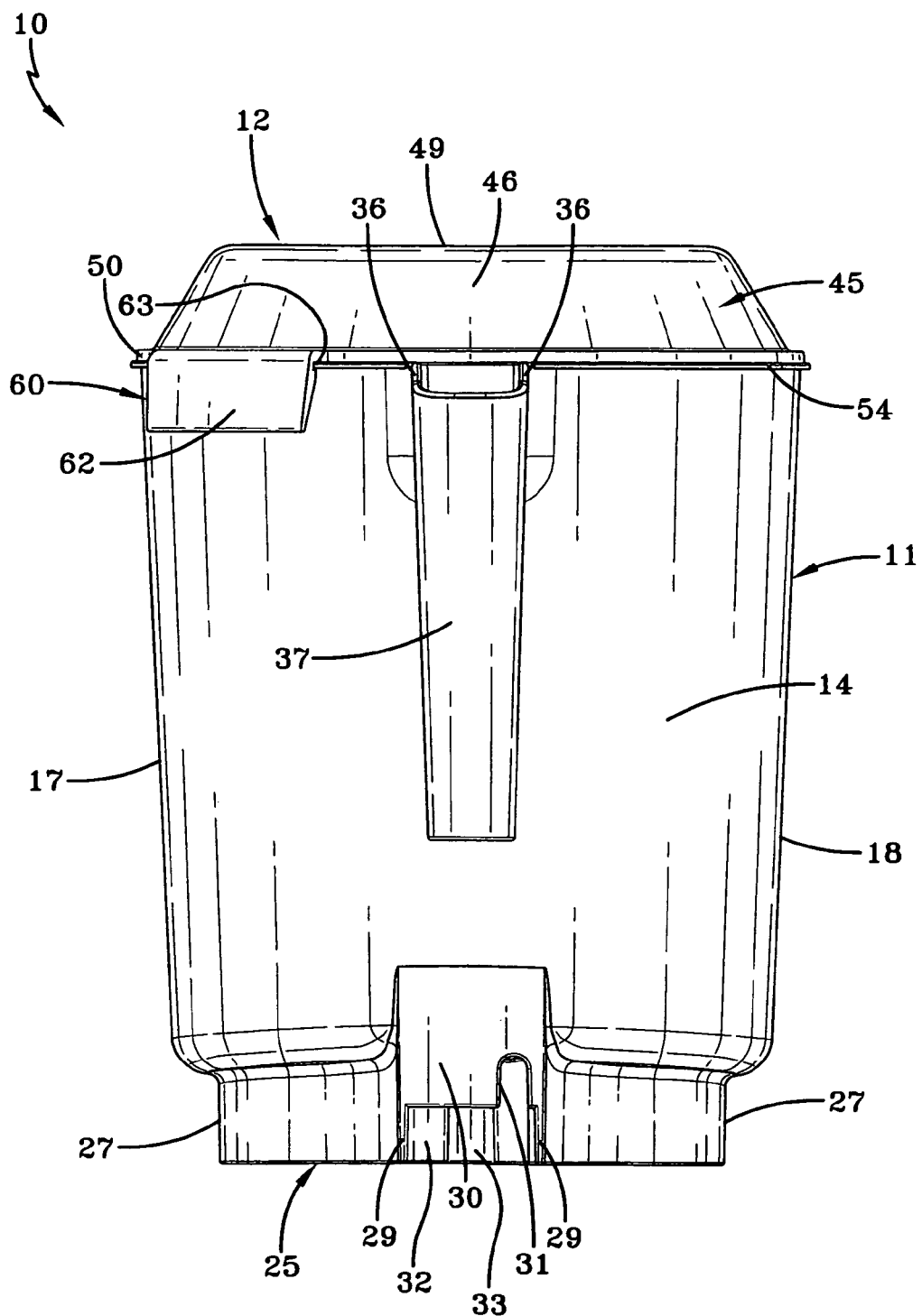
FIG. 3 is a rear elevational view thereof showing the handle and a liquid drainage area.
Figure 4:
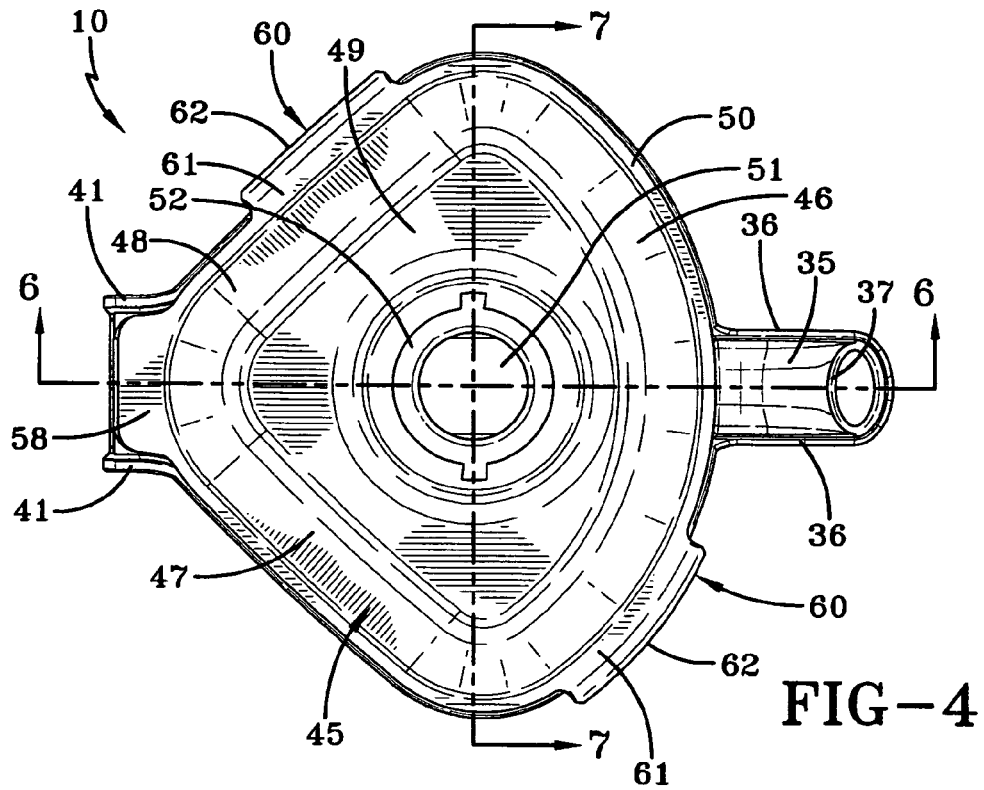
FIG. 4 is a top plan view thereof.

As best shown in FIG. 3, tab 30 has a slot 31 formed therein which provides a drainage passage for water which may accumulate within skirt 25 when container 10 is being held upside down and being cleaned. Also, as best shown in FIG. 5, a baffle wall is formed by fingers 32 which extend from the skirt walls into the opening of partial lobe 28 toward each other with a space 33 formed therebetween. The tab 30 extends at least partially over the space 33. Sound emanating from the action of the rotating blade 20 is thus caused to take a sinuous path around baffle fingers 32, through space 33 and around the tab 30 which tends to reduce the sound more than if it were otherwise allowed to pass directly through partial lobe 28.

Figure 1:
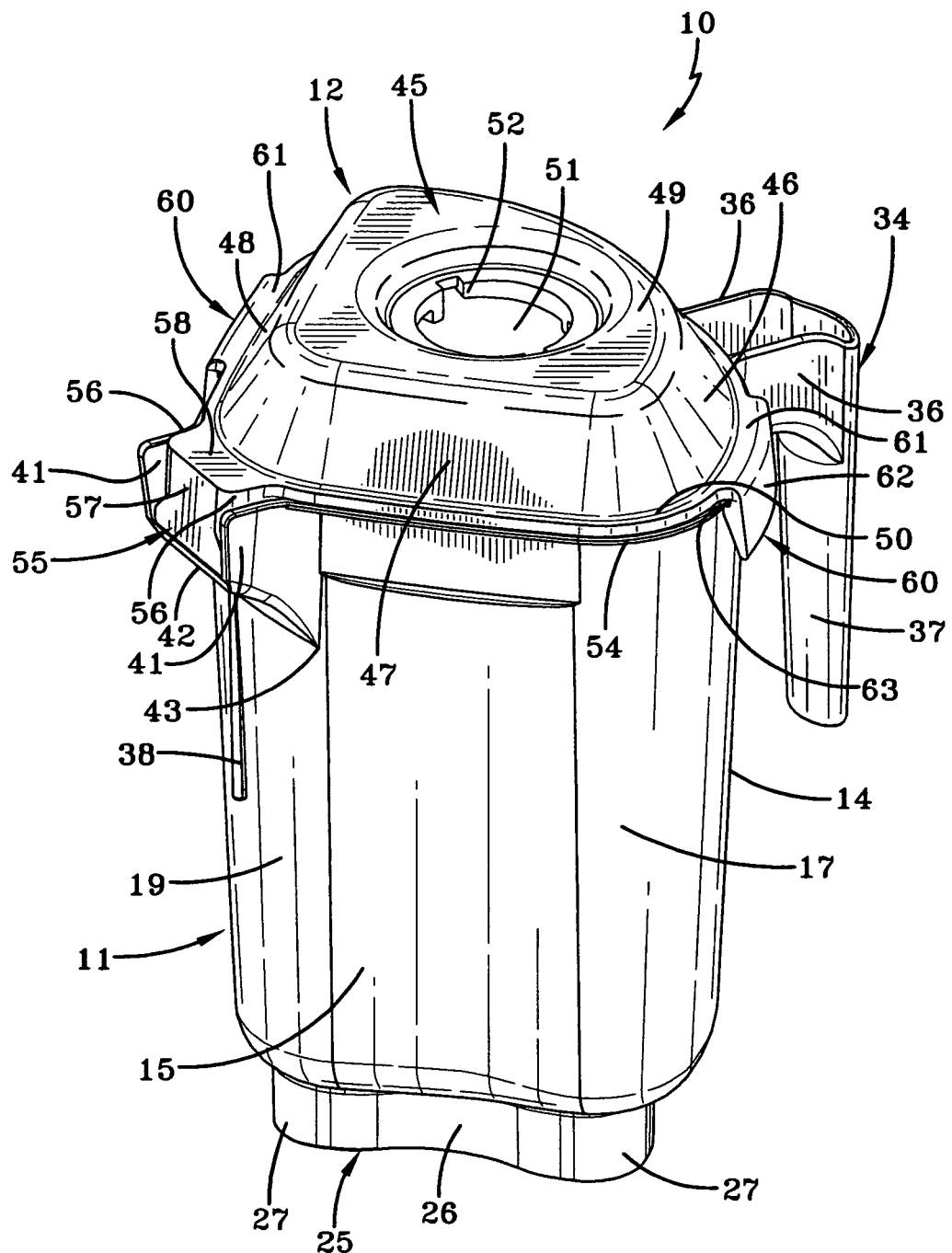
FIG. 1 is a perspective view of a blender container and cover made in accordance with the present invention.
Figure 2:
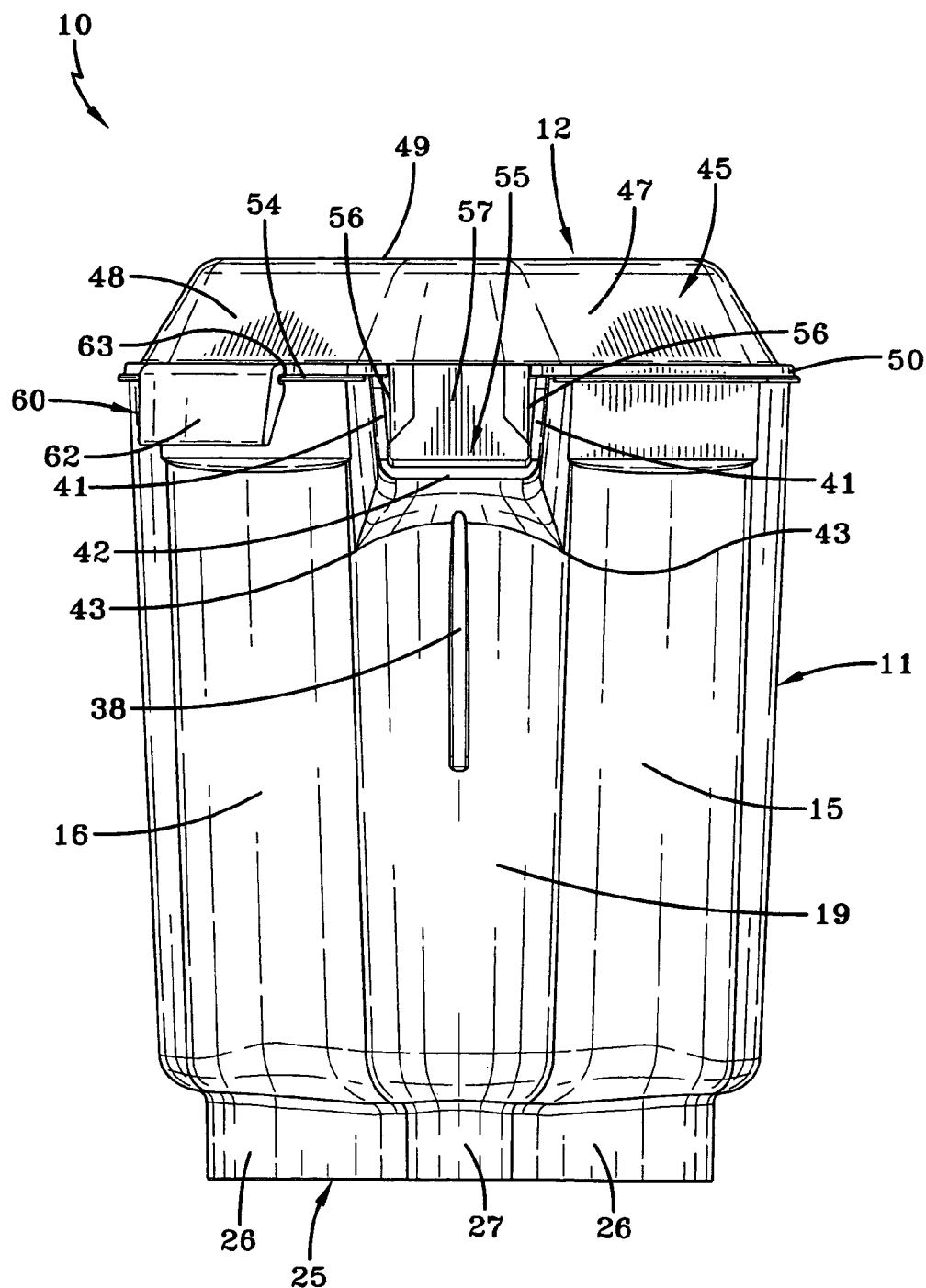
FIG. 2 is a front elevational view thereof showing the spout.

A handle, generally indicated by the numeral 34, is provided on one of the sidewalls. As shown, handle 34 is preferably positioned at the midpoint of sidewall 14 and directly opposite to corner 19. Handle 34 includes a ledge 35 extending outwardly from sidewall 14, and opposed sides 36 extend upwardly from each end of ledge 35 and extend outwardly from sidewall 14. Sides 36 and ledge 35 turn downwardly to form a handle grip portion or stem 37. Handle stem 37 is preferably hollow so that container 10 can readily be nested within a like container for convenience of shipping and storing. When so nested, the handle stem 37 of one container will be received in the hollow stem of the other container. A rib 38 (FIGS. 1 and 2) positioned on corner 19 prevents one container 10 from nesting too deeply within, or otherwise being wedged within, a like container.

Container 10 includes a pouring spout generally indicated by the numeral 40. Spout 40 is preferably formed directly opposite to handle 34 and thus is shown as being formed in corner 19. Spout 40 includes opposed walls 41 which extend outwardly from each side of a spout opening in corner 19. A spout bottom wall 42 extends between walls 41 and curves downwardly into corner 19. Wall 42 thus starts at point 43 along corner 19 which is spaced from the top of container 10 by preferably twenty to thirty percent of the height of the sidewalls 14, 15, and 16 container 10. As a result, material intended to be poured through spout 40 will reach it far before reaching the top of container 10 having to travel only seventy to eighty percent of the height of container 10 to do so. Thus, essentially all of the material intended to be received and pass through spout 40 will do so rather than pass around the sides of the spout as in the prior art.

Container cover 12 includes a domed surface 45 peripherally configured like container 11. That is, surface 45 includes an arcuate wall 46 and two generally straight walls 47, 48. A top wall 49 is formed at the top of walls 46, 47, and 48, and a rim 50 is formed at the bottom of walls 46, 47 and 48. A central opening 51 is provided in top wall 49 to permit access to the inside of container 11 while cover 12 is positioned thereon, should access be necessary for stirring of the materials or the like. However, opening 51 is normally closed by a plug (not shown) which can be held in opening 51 by any suitable means, a bayonet lock system 52 being shown in the drawings for that purpose.

Figure 7:
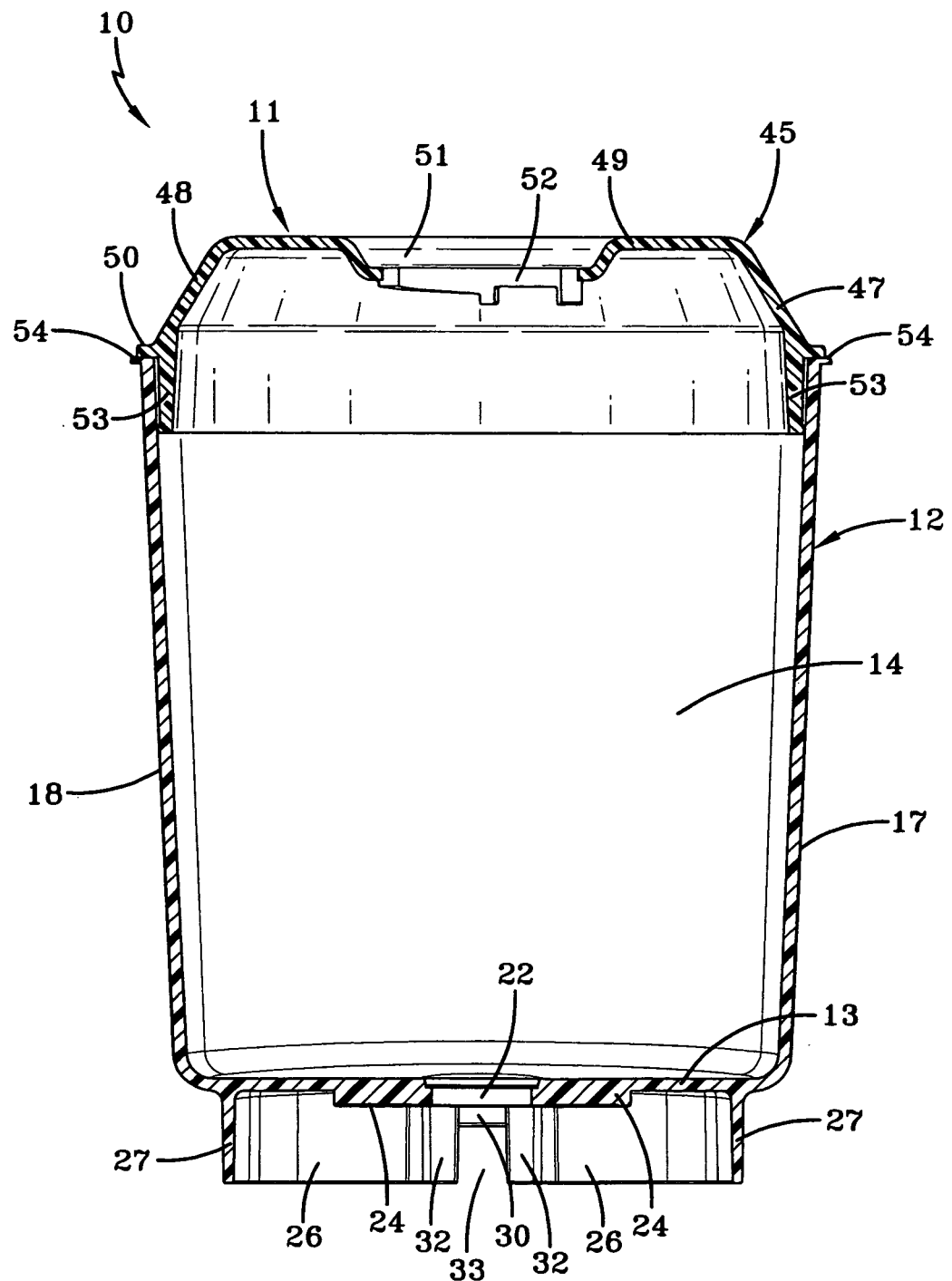
FIG. 7 is a sectional view taken substantially along line 7-7 of FIG. 4.

A peripheral flange 53 (FIGS. 6 and 7) extends downwardly from domed surface 45, and when cover 12 is positioned on container 11, flange 53 engages the inside of container walls 14, 15, and 16. At this time, the rim 50 of cover 12 rests on a peripheral lip 54 formed at the top of walls 14, 15, and 16. Also, when cover 12 is so positioned on container 11, container spout 40 is closed by a plug assembly generally indicated by the numeral 55. Plug assembly 55 includes opposed sidewalls 56 which engage spout walls 41 and a front wall 57 that extends between sidewalls 56 and engages spout bottom wall 42 when cover 12 is on container 11. A plug top wall 58 extends from wall 57 and between sidewalls 56 to domed surface 45. As a result, spout 40 can be totally closed by wall 57 of plug assembly 55. In addition, a flap seal wall 59 extends downwardly from near the junction of plug top wall 58 and cover domed surface 45 to a point below the point 43 of entrance to spout 40. Wall 59 thus engages the radiused cover 19 of container 11 to further seal the spout 40.

Cover 12 is held on container 11 by lock flaps generally indicated by the numeral 60. Two identical lock flaps 60 are shown, one extending from rim 50 at an area along wall 46 and the other extending from rim 50 at an area along wall 48. Each lock flap 60 includes a top surface 61 extending outwardly from rim 50 and a tab or handle 62 extending downwardly from top surface 61. The inside of handle 62 is provided with a notch 63 therein, and when cover 12 is on container 11, container lip 54 is received in notch 63. Cover 12 is thus held on container 11, but can be easily removed by merely lifting and flexing the handle 62 of one of the flaps 60 to move lip 54 out of notch 63.

In view of the foregoing, it should be evident that a container and cover constructed as described herein accomplishes the objects of the invention and otherwise substantially improves the art.

What is claimed is:

1. A container for a blender comprising a base surface, a blade rotatable on an axis and positioned above said base surface, an arcuate wall extending upwardly from said base surface, and first and second generally straight walls extending upwardly from said base surface and intersecting each other, said first and second walls each intersecting said arcuate wall, said arcuate wall and said first and second walls being positioned such that the axis of rotation of said blade is closer to said arcuate wall than to said first and second walls.

2. The container of claim 1 wherein said base surface slopes downwardly from said arcuate wall toward said first and second walls.

3. The container of claim 1 further comprising a spout formed at the intersection of two of said walls.

4. The container of claim 3 wherein said walls terminate as the upper end of the container, said spout communicating with said walls at a point located approximately twenty to thirty percent of the height of said walls from the upper end of the container.

5. The container of claim 1 further comprising a skirt extending downwardly from said base surface, and a sound muffler carried by said skirt.

6. The container of claim 5 wherein said skirt has an opening therein, said sound muffler including fingers extending from said skirt into said opening and being spaced from each other.

7. The container of claim 5 further comprising a spout formed at the intersection of two of said walls.

8. A container for a blender comprising a base surface, walls extending upwardly from said base surface, a rotatable blade carried above said base surface and creating a sound when blending items in the container, a skirt having a sidewall extending downwardly from said base surface, an opening in said sidewall of said skirt, and fingers extending from said sidewall of said skirt into said opening and being spaced from each other to baffle the sound created by said blade of the blender.

9. The container of claim 8 further comprising a tab extending downwardly into said opening and being positioned at least partially over the space between said fingers.

10. The container of claim 9 further comprising a slot in said tab.

11. The container of claim 8 wherein said sidewall of said skirt includes a plurality of spaced lobes, said opening being in one of said lobes.

12. The container of claim 8 further comprising a spout formed at the intersection of two of said walls.

13. The container of claim 12 wherein said walls terminate as the upper end of the container, said spout communicating with said walls at a point located approximately twenty to thirty percent of the height of said walls from the upper end of the container.

14. A container for a blender comprising a base surface, walls extending upwardly from said base surface, a blade rotatable on an axis and positioned above said base surface, the axis of rotation of said blade being positioned closer to one of said walls than the other of said walls, a skirt having a sidewall extending downwardly from said base surface, an opening in said sidewall of said skirt, and fingers extending from said sidewall of said skirt into said opening and being spaced from each other to baffle the noise of the blender.

15. A container for a blender comprising a base surface, a blade rotatable on an axis and positioned above said base surface, an arcuate wall extending upwardly from said base surface, first and second generally straight walls extending upwardly from said base surface and intersecting each other, said first and second walls each intersecting said arcuate wall, said arcuate wall and said first and second walls terminating as the upper end of the container and being positioned such that the axis of rotation of said blade is closer to said arcuate wall than said first and second walls, a skirt extending downwardly from said base surface, an opening in said skirt, fingers extending from said skirt into said opening and being spaced from each other to baffle the noise from said blade of the blender, and a spout formed at the intersection between two of said walls, said spout communicating with said walls at a point located approximately twenty to thirty percent of the height of said walls from the upper end of the container.

* * * * *